US006901665B2

(12) United States Patent
Sun et al.

(10) Patent No.: US 6,901,665 B2
(45) Date of Patent: Jun. 7, 2005

(54) PNEUMATIC PRUNING HOOK WITH A TELESCOPIC SHANK

(76) Inventors: Yung Yung Sun, No.66, Shangtian St., Dali City, Taichung County (TW); Chuan Ching Cheng, 4F, No. 16, Alley 8, Lane 33, Sec. 2, Sing-an Rd., Taichung City (TW)

(*) Notice: Subject to any disclaimer, the term of this patent is extended or adjusted under 35 U.S.C. 154(b) by 53 days.

(21) Appl. No.: 10/687,666

(22) Filed: Oct. 20, 2003

(65) Prior Publication Data

US 2005/0081387 A1 Apr. 21, 2005

(51) Int. Cl.[7] ............................................. A01G 3/25
(52) U.S. Cl. ....................................... 30/249; 30/296.1
(58) Field of Search ............................. 30/249, 296.1, 30/228

(56) References Cited

U.S. PATENT DOCUMENTS

| | | | | |
|---|---|---|---|---|
| 2,391,676 A | * | 12/1945 | Browning | 30/228 |
| 2,493,696 A | * | 1/1950 | Potstada | 30/228 |
| 2,612,140 A | * | 9/1952 | Miller | 30/228 |
| 2,743,703 A | * | 5/1956 | Miller | 92/59 |
| 3,373,490 A | * | 3/1968 | Lendaro | 30/228 |
| 3,535,783 A | * | 10/1970 | Thatcher | 30/228 |
| 3,584,381 A | * | 6/1971 | Jamison | 30/228 |
| 4,977,674 A | * | 12/1990 | van der Merwe et al. | 30/379.5 |
| RE34,358 E | * | 8/1993 | Miller | 30/296.1 |
| 5,341,572 A | * | 8/1994 | Michelson | 30/228 |
| 5,826,341 A | * | 10/1998 | Massa | 30/296.1 |
| 5,884,403 A | * | 3/1999 | Rogers | 30/296.1 |
| 5,894,667 A | * | 4/1999 | Van Den Hout | 30/249 |
| 5,926,961 A | * | 7/1999 | Uhl | 30/296.1 |
| 6,374,498 B1 | * | 4/2002 | Liu | 30/211 |

FOREIGN PATENT DOCUMENTS

| | | | |
|---|---|---|---|
| DE | 19923727 | * | 4/2001 |
| SU | 1715244 | * | 2/1992 |

* cited by examiner

Primary Examiner—Stephen Choi
(74) Attorney, Agent, or Firm—Rosenberg, Klein & Lee

(57) ABSTRACT

A pneumatic pruning hook with a telescopic shank includes a handle having a chamber defined therein and connected to a compressed air source, a valve mounted in the chamber for selectively allowing the compressed flowing into the chamber. The telescopic shank includes an outer tube longitudinally secured to the handle and an inner tube partially slidably received in the outer tube. A work device is secured on the inner tube opposite to the handle. A spiraled hose is received in the telescopic shank and respectively connected the handle and the work device for guiding the compressed air into the work device. A safety is mounted to the work device for selectively engaged to the work device to prevent the work device from an unexpected operation.

8 Claims, 10 Drawing Sheets

US 6,901,665 B2

PNEUMATIC PRUNING HOOK WITH A TELESCOPIC SHANK

BACKGROUND OF THE INVENTION

1. Field of the Invention

The present invention relates to a pneumatic pruning hook with a telescopic shank, and more particularly to a pneumatic pruning hook with a telescopic shank that has an excellent airtight effect.

2. Description of Related Art

A conventional telescopic shank (6) of a pneumatic pruning hook in accordance with the prior art shown in FIG. 11 comprises an outer tube (62) and an inner tube (61) partially slidably received in the outer tube (62). A convey element (7) is longitudinally and separately received in the shank (6) for conveying compressed air. The convey element (7) includes an outer pipe (72) corresponding to the outer tube (62) of the shank (6) and an inner pipe (71) partially and slidably received in the outer pipe (72). The inner pipe (71) is moved with the inner tube (61) to adjacent a total length of the conventional pruning hook.

The inner pipe (71) is airtightly connected to the inner pipe (72) to prevent the compressed air from leaking between the inner pipe (71) and the outer pipe (72). A first O-ring (711) is mounted around one end of the inner pipe (711) and airtightly abuts an inner periphery of the outer pipe (711), and a second O-ring (721) is annularly mounted in the inner periphery of the outer pipe (72) and airtightly abuts an outer periphery of the inner pipe (71) to prevent the compressed air in the convey element (7) from leaking between the inner pipe (71) and the outer pipe (72).

However, the first O-ring (711) rubs against the inner periphery of the outer pipe (72) and the second O-ring (721) rubs against the outer periphery of the inner pipe (71) when adjusting the length of the shank (6) of the conventional pneumatic pruning hook. The airtight effect between the inner pipe (71) and the outer pipe (72) will be disappeared when the first O-ring (711) and the second O-ring (721) are worn out.

The present invention has arisen to mitigate and/or obviate the disadvantage of the conventional telescopic shank of a pneumatic pruning hook.

SUMMARY OF THE INVENTION

The main objective of the present invention is to provide an improved pneumatic pruning hook with a telescopic shank that has an excellent airtight effect.

To achieve the objective, the pneumatic pruning hook in accordance with the present invention comprises a handle having a chamber defined therein and connected to a compressed air source, a valve mounted in the chamber for selectively allowing the compressed flowing into the chamber. The telescopic shank includes an outer tube longitudinally secured to the handle and an inner tube partially slidably received in the outer tube. A work device is secured on the inner tube opposite to the handle. A spiraled hose is received in the telescopic shank and respectively connected the handle and the work device for guiding the compressed air into the work device. A safety is mounted to the work device for selectively engaged to the work device to prevent the work device from an unexpected operation.

Further benefits and advantages of the present invention will become apparent after a careful reading of the detailed description with appropriate reference to the accompanying drawings.

DETAILED DESCRIPTION OF THE INVENTION

Figure 1:
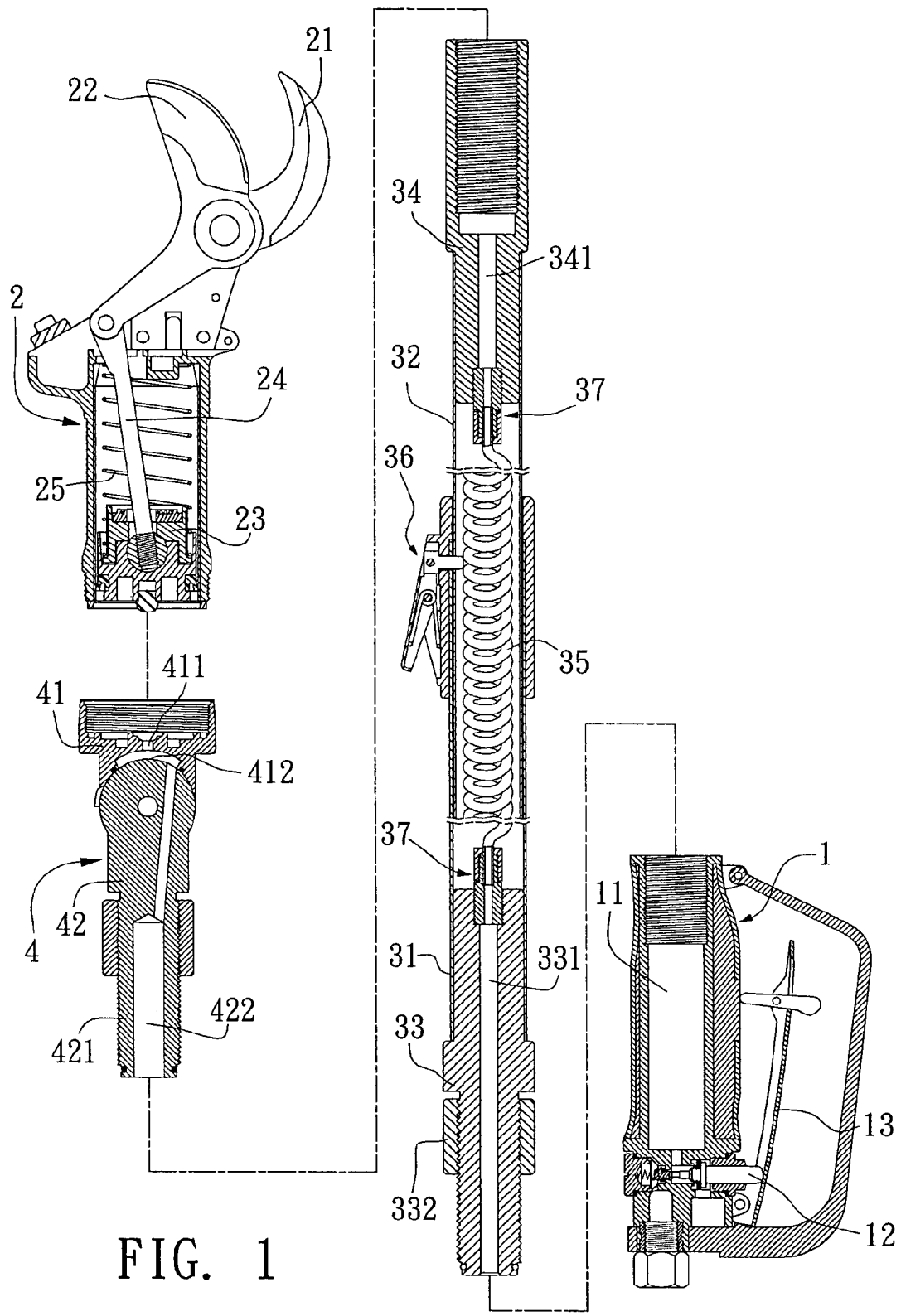
FIG. 1 is an exploded cross-sectional view of the pneumatic pruning hook in accordance with the present invention.
Figure 2:
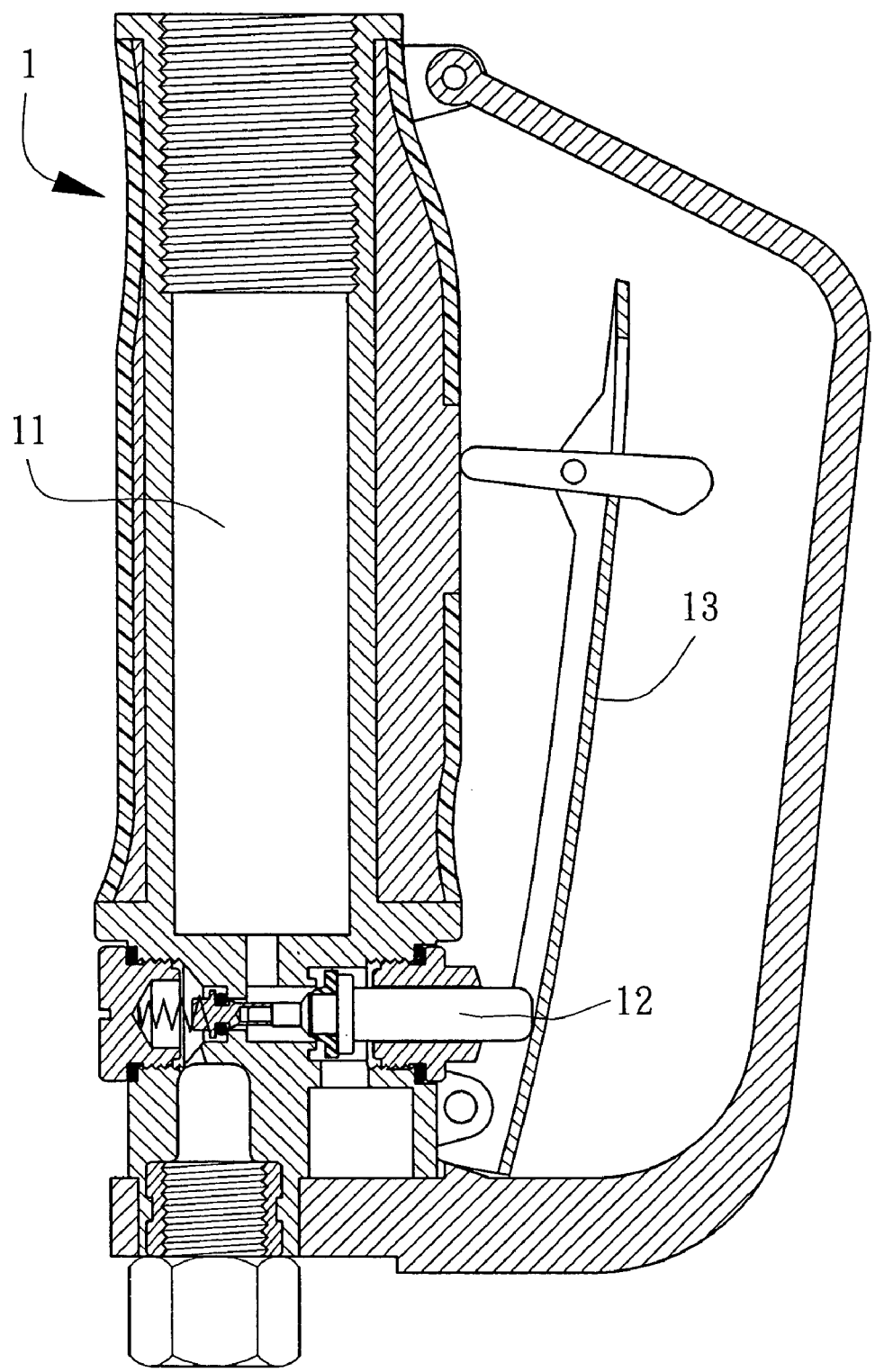
FIG. 2 is a cross-sectional view of a handle bar of the pneumatic pruning hook in FIG. 1.

Referring to the drawings and initially to FIGS. 1–6, a pneumatic pruning hook with a telescopic shank in accordance with the present invention comprises a handle (1), a telescopic shank (3) with a first end connected to the handle (1), a connecting device (4) longitudinally connected to a second end of the telescopic shank (3), a work device (2) longitudinally pivotally connected to the connecting device (4) and a safety (5) mounted to the work device (2).

The handle (1) is adapted to a compressed air source and has a chamber (11) defined in the handle (1). A valve (12) is mounted in the handle (1) for controlling the compressed air flowing into the chamber (11) and a lever (13) is pivotally mounted to the handle (1) for actuating the valve (12).

The telescopic shank (3) includes a first connector (33) mounted to the handle (1) and having a first passage (331) defined in the first connector (33). The first connector (33) has a threaded section and a nut (332) is screwed onto the threaded section of the first connector (33). The nut (332) is screwed to abut the handle (1) to enhance the connection between the handle (1) and the first connector (33). The first passage (331) longitudinally extends through the first connector (33) and communicates with the chamber (11) in the handle (1). An outer tube (31) includes a first end longitudinally securely connected to the first connector (33) and a second end having a locking device (36) mounted to the outer tube (31). A first through hole (311) is defined in the outer tube (31) near the second of the outer tube (31). An inner tube (32) partially slidably received in the outer tube (31). The inner tube (32) includes a first end inserted into the outer tube (31) and a second end having a second connector (34) longitudinally mounted to the inner tube (32). The inner tube (32) has a series of second holes (321) defined in the first end of the inner tube (32) and each selectively communicating with the first hole (311) in the outer tube (31). The second connector (34) has a second passage (341) longitudinally defined therein and extending through the second connector (34). A spiraled hose (35) is received in the telescopic shank (3). The spiraled hose (35) has two opposite ends each having a joint (37) secured thereon. The two joints (37) respectively secured mounted to the first connector (33) and the second connector (34) so that the first passage (331) and the second passage (341) is communicated with each other due to the spiraled hose (35).

The locking device (36) includes a collar (361) mounted around the outer tube (31) and a lever (362) pivotally mounted on the collar (361). A stub (364) is pivotally connected to a first end of the lever (362) and extending through the first hole (311) and a corresponding one of the series of second holes (321) to hold the inner tube (32) in place relative to the outer tube (31). A torsion spring (363) is mounted between the collar (361) and the lever (362) to provide a restitution force to the lever (362) after being pushed.

The connecting device (4) includes a body (42) having a protrusion (421) extending therefrom and longitudinally mounted into the second connector (34). A third passage (422) is defined in and extends through the body (42) and the protrusion (421) to communicate with the passage (341) in the second connector (34). A connecting seat (41) is slidably mounted to the body (42). The connecting seat (41) has a recess (412) defined in a bottom thereof and communicating with the third passage (422). A path (411) is defined in the connecting seat (41) and communicates with the recess (412).

The work device (2) includes a cylinder (20) longitudinally mounted to the connecting seat (41) and communicating with the path (411) in the connecting seat (41). A piston (23) is reciprocally movably received in the cylinder (20) and has a block (231) secured on a bottom of the piston (23) to airtightly close the path (411) when the piston (23) abuts the connecting seat (41) after working. A fixed blade (21) is secured on a top of the cylinder (20) and a spring (25) is compressively mounted between the piston (23) and the fixed blade (21) to provide a restitution force to the piston (23) after being upwardly moved. A movable blade (22) is pivotally mounted to the fixed blade (21) for forming a scissors structure. A crank (24) includes a first end pivotally connected to the piston (23) and a second end pivotally connected to the movable blade (22) to drive the movable blade (22) moved toward the fixed blade (21) when the piston (23) is upwardly moved in the cylinder (20).

Figure 8:
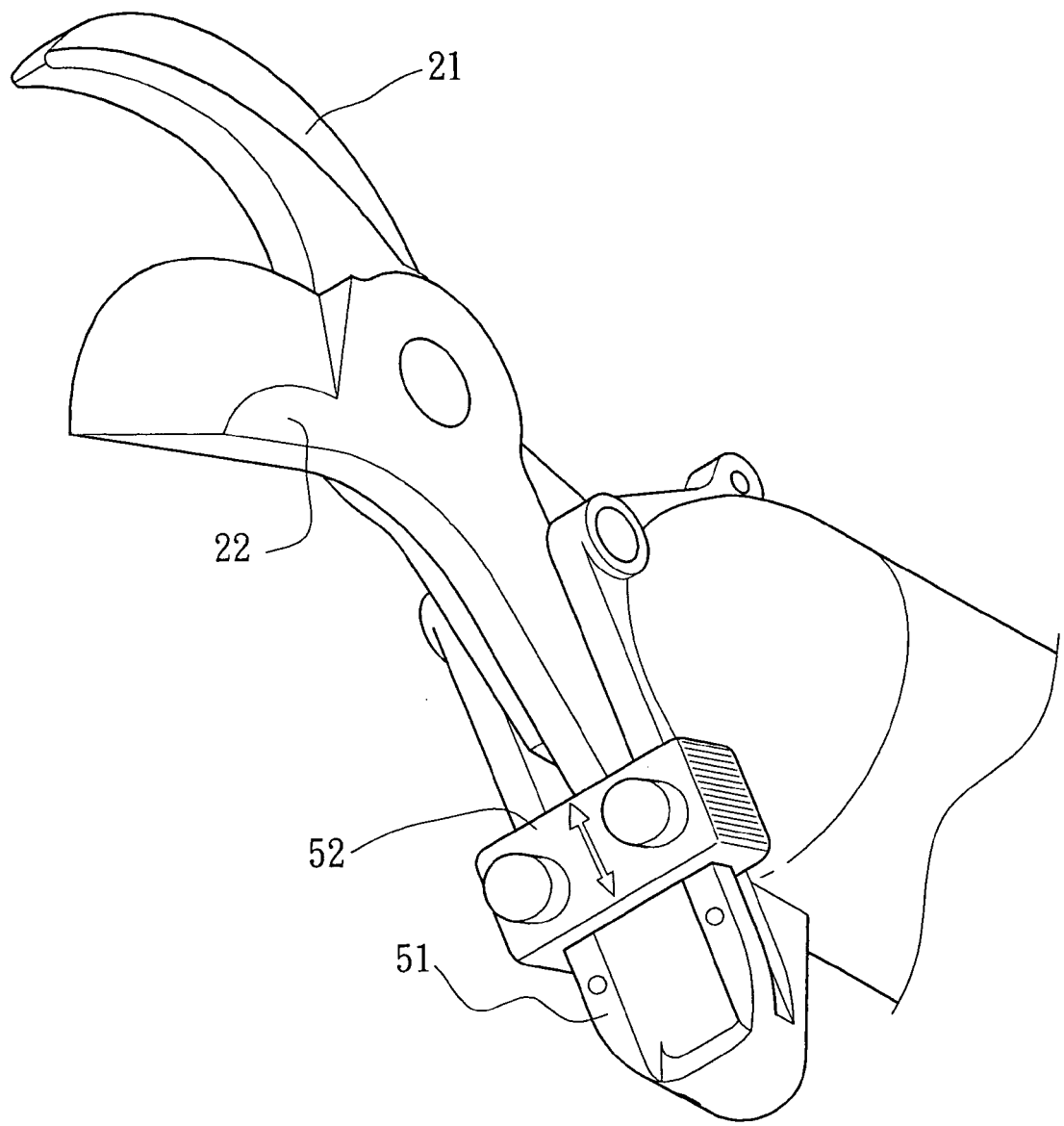
FIG. 8 is a perspective view of a safety of the pneumatic pruning hook in FIG. 1.
Figure 9:
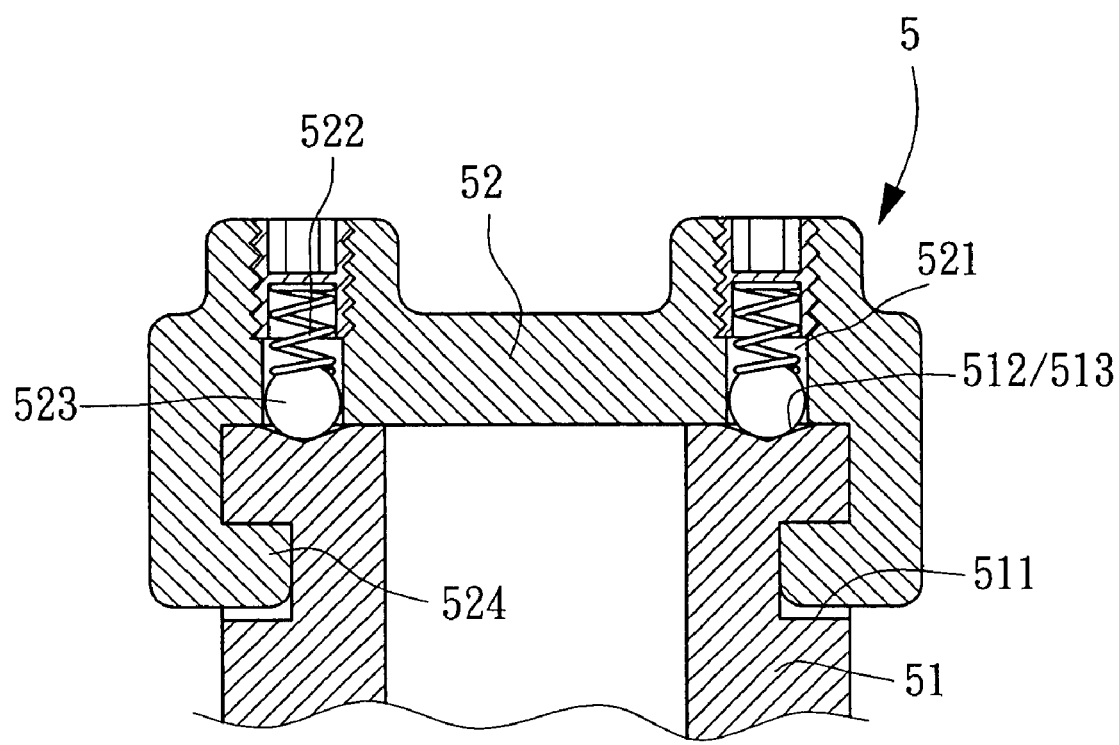
FIG. 9 is a side cross-sectional view of the safety in FIG. 8.
Figure 10:
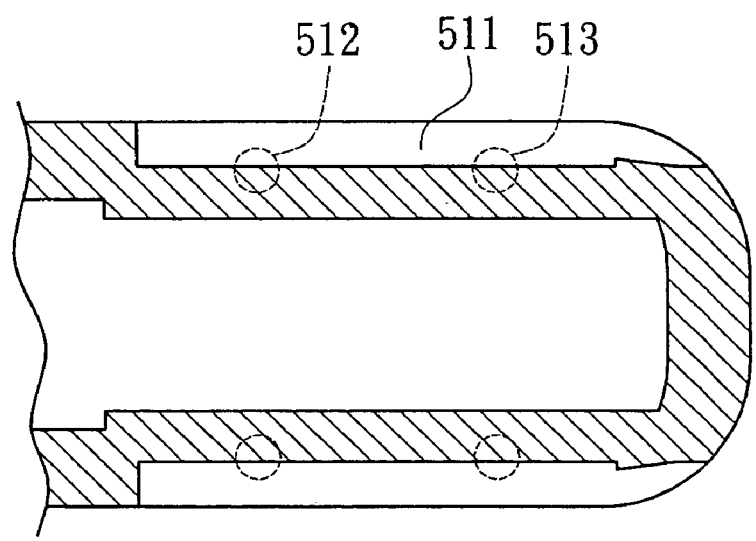
FIG. 10 is a top cross-sectional view of the safety in FIG. 8.
Figure 11:
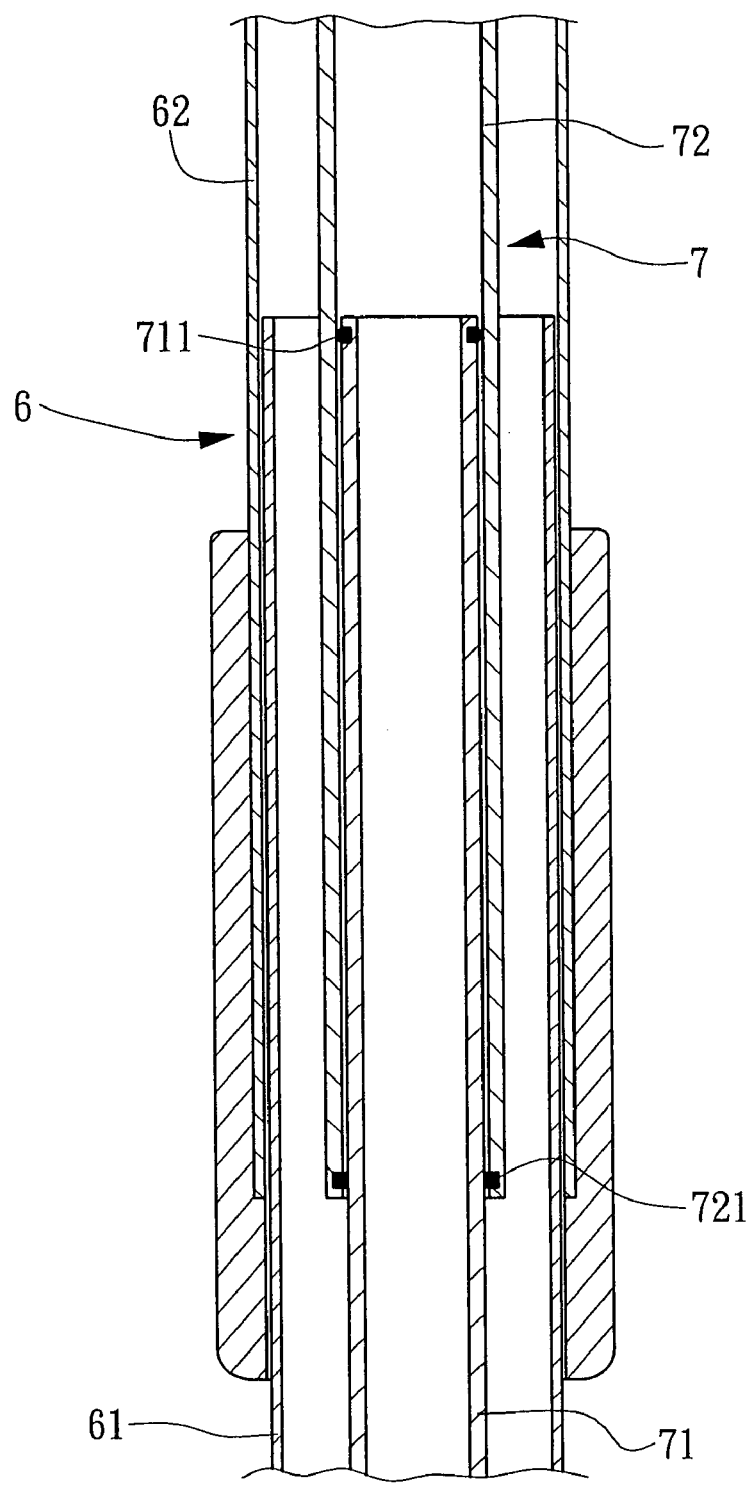
FIG. 11 is a cross-sectional of a conventional telescopic shank of a pneumatic pruning hook in accordance with the prior art.

A safety (5) is secured on the work device (2). With reference to FIGS. 8–10, the safety (5) has two rails (51) extending from the work device (2) and each has a groove (511) laterally defined therein. The two grooves (511) are opposite to each other. Each rail (51) includes a top having a first dimple (512) defined near the work device (2) and a second dimple (513) defined near a free end of each of the rail (51). A slider (52) is slidably mounted on the two rails (51) and selectively engaged to the movable blade (22). The slider (52) has two blind holes (521) each aligning with a corresponding one of the two rails (51) and receiving a spring (522). A steel ball (523) is received in a corresponding one of the two blind holes (521) and partially extending out of the slider (52) for being received in a corresponding first/second dimple (512/513) to hold the slider (52) in place due to a restitution force of each of the two springs (522). The slider (52) has two opposite sides each has a buckle (524) laterally extending therefrom and slidably received in a corresponding one of the two grooves (511) in the two rails (51).

Figure 3:
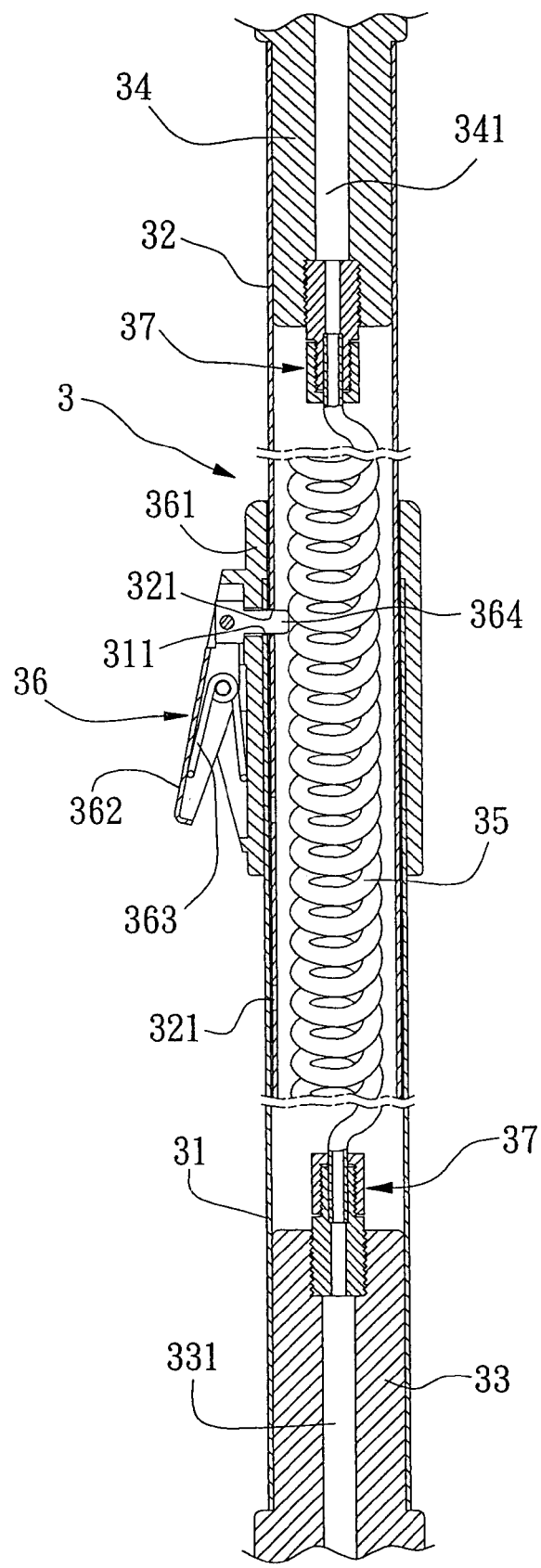
FIG. 3 is a cross-sectional view of a shank of the pneumatic pruning hook in FIG. 1.
Figure 4:
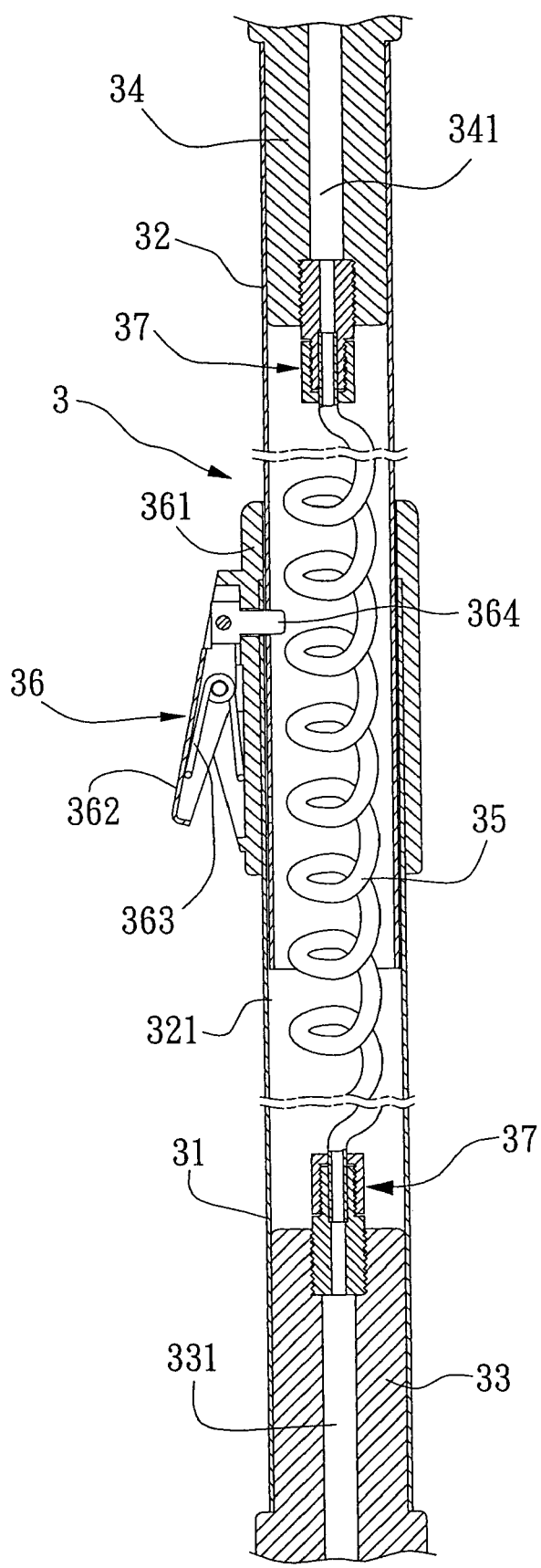
FIG. 4 is a cross-sectional view of the shank in FIG. 3 after extending.
Figure 5:
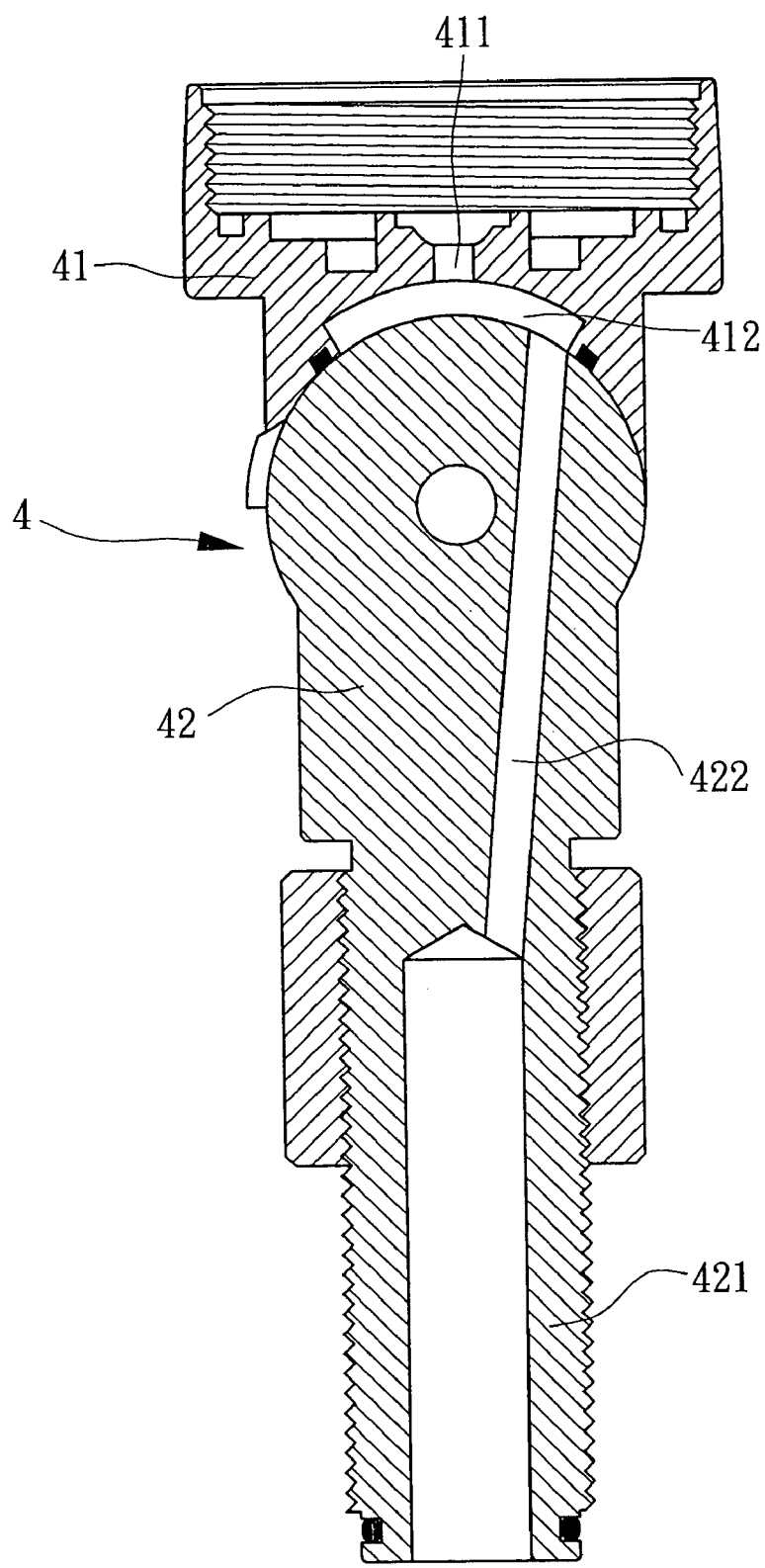
FIG. 5 is a cross-sectional view of a connector of the pneumatic pruning hook in FIG. 1.
Figure 6:
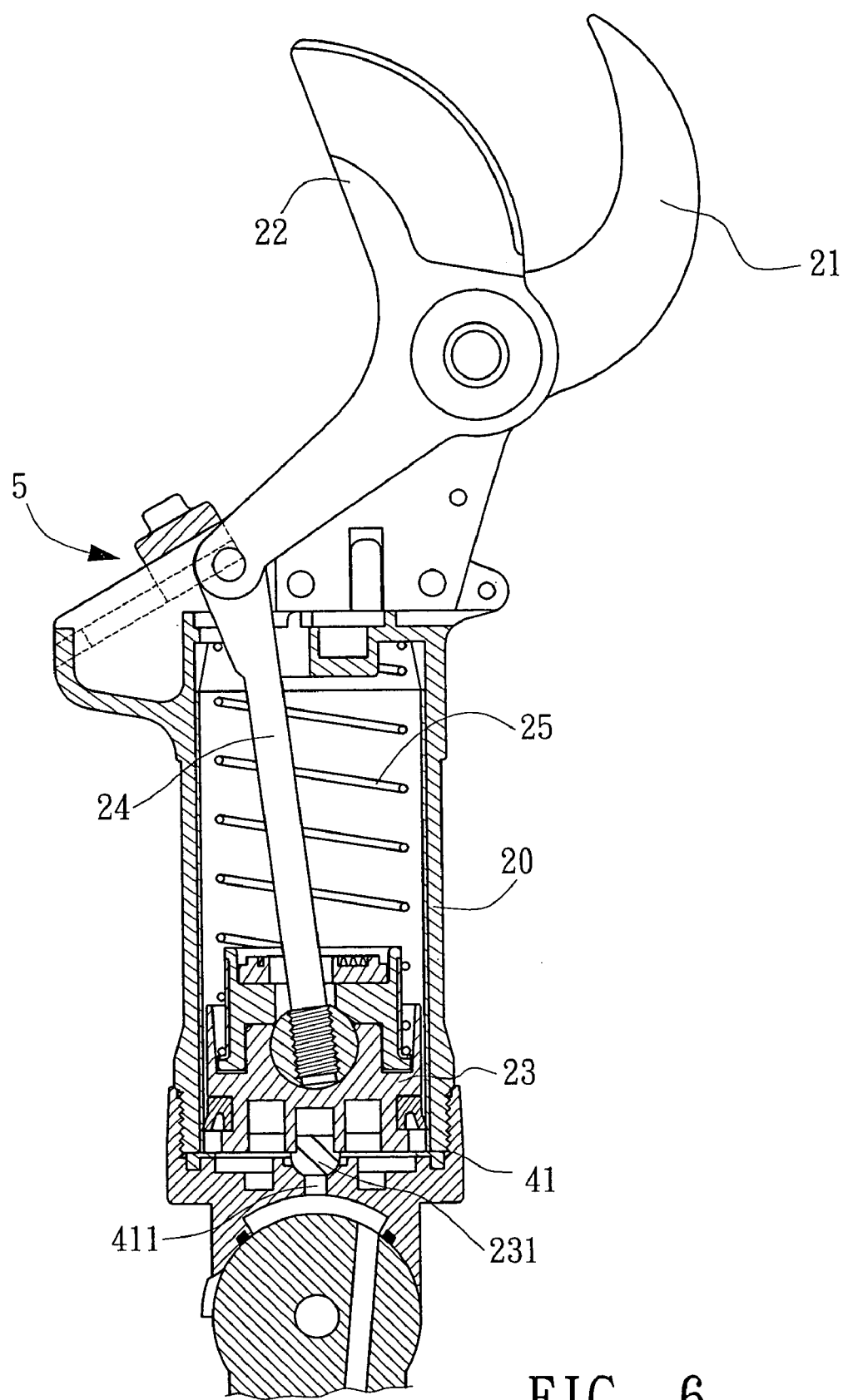
FIG. 6 is a cross-sectional view of an operating device of the pneumatic pruning hook in FIG. 1.
Figure 7:
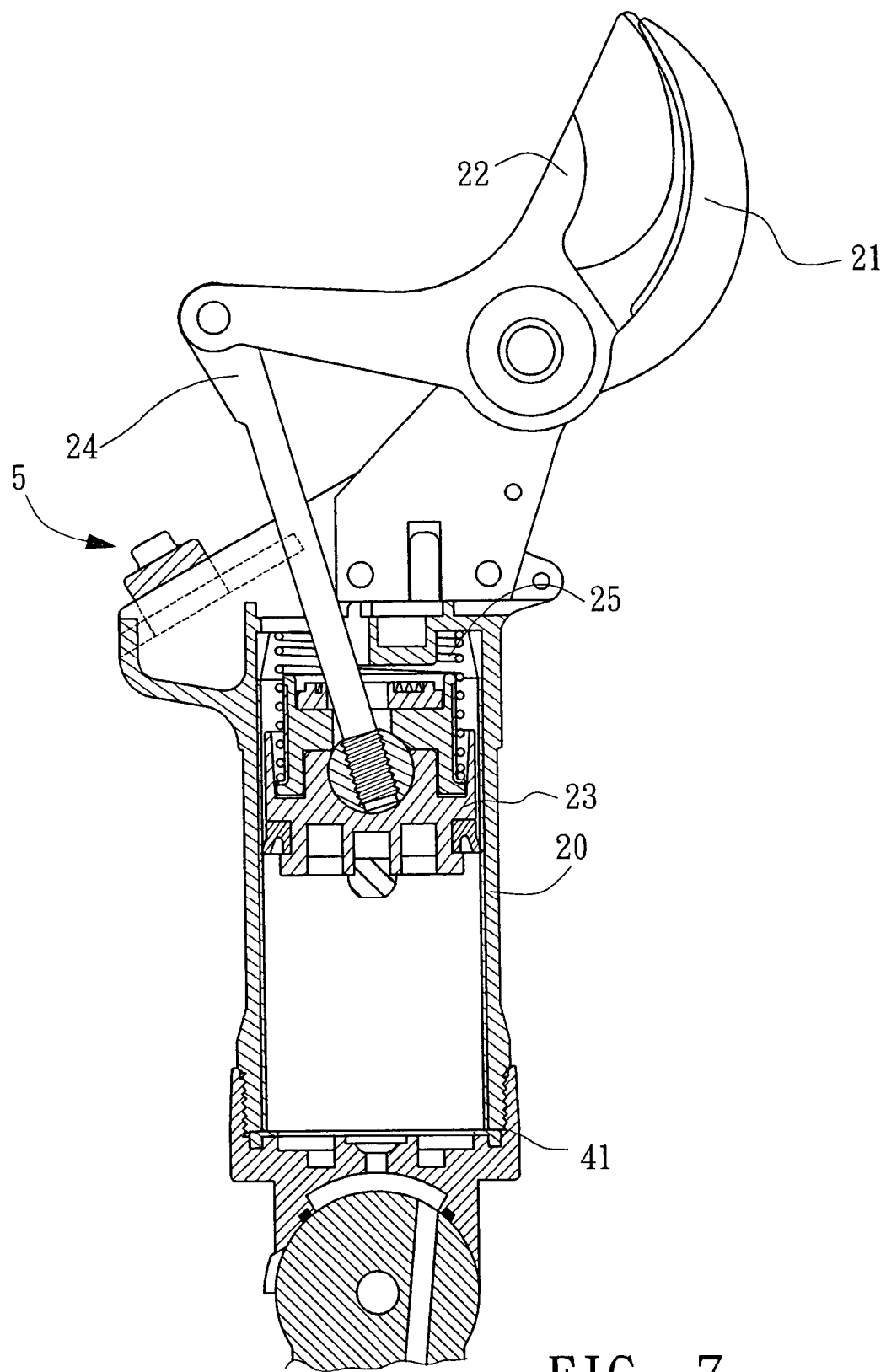
FIG. 7 is an operational side plan view of the operating device in FIG. 6.

With reference to FIGS. 3 and 4, when adjusting the length of the telescopic shank (3), the lever (362) of the locking device (36) is pushed toward the collar (361) to make the stub (264) be moved and detached from the first hole (311) and the second hole (321), thereby the inner tube (32) can be freely moved relative to the outer tube (31). The lever (362) is released and then the stub (364) inserted the first hole (311) and a corresponding one of the series of second holes (321) to fix the inner tube (32) again when the inner tube (32) extends to a suitable length relative to the outer tube. The spiraled hose (35) extends with the inner tube (32) due to the spiral-shape thereof.

With reference to FIGS. 6–10, the movable blade (22) is limited by the slider (52) and cannot be operated to prevent the pneumatic pruning hook from an unexpected operation and enhance the safe effect of the pneumatic pruning hook when each steel ball (523) is partially received in the first dimple (512). The movable blade (22) can be freely operated to cut branch when the slider (52) is laterally moved and each steel ball (523) is partially received in a corresponding one of the two second dimples (513) and the compressed air is guided into the cylinder (20).

As described above, the telescopic shank (3) of the present invention provides an excellent airtight effect to the pneumatic pruning hook because the spiraled hose (35) is airtightly connected to the first connector (33) and the second connector (34) by the joints (37). Furthermore, the safety (5) enhances the safe effect of the pneumatic pruning hook to prevent the pneumatic pruning hook from an unexpected operation.

Although the invention has been explained in relation to its preferred embodiment, it is to be understood that many other possible modifications and variations can be made without departing from the spirit and scope of the invention as hereinafter claimed.

What is claimed is:

1. A pneumatic pruning hook with a telescopic shank, comprising:
   a handle including a chamber defined therein and adapted to be connected to a compressed air source, a valve mounted in the chamber for selectively allowing the compressed air flowing into the chamber, a lever pivotally mounted on the handle to actuate the valve;
   the telescopic shank including an outer tube having a first end longitudinally secured to the handle and a second end opposite to the first end of the outer tube, an inner tube partially slidably received in the outer tube, the inner tube having a first end extending into the outer tube and a second end opposite to the first end of the inner tube;
   a work device secured on the second end of the inner tube;
   a spiraled hose received in the telescopic shank and having two opposite ends respectively connected the handle and the work device for guiding the compressed air into the work device, the spiraled hose extending with the inner tube; and
   a safety mounted to the work device for selectively engaged to the work device to prevent the work device from an unexpected operation.

2. The pneumatic pruning hook as claimed in claim 1, wherein the telescopic shank comprises a first connector securely connected and partially longitudinally received in the first end of the outer tube, the first connector having a first passage longitudinally defined therein and extending therethrough, the first passage communicating with the chamber in the handle, a second connector longitudinally connected to the second end of the inner tube and having a second passage longitudinally defined therein and extending therethrough, the spiraled hose having two opposite ends each having a joint mounted thereon, the two joints respectively connected to the first connector and the second connector to make the spiraled hose communicate with the first passage and the second passage.

3. The pneumatic pruning hook as claimed in claim 2 further comprising a connecting device longitudinally mounted between the second connector and the work device, the connecting device including a third passage longitudinally therein and communicating with the second passage in the second connector.

4. The pneumatic pruning hook as claimed in claim 3, wherein the connecting device comprises a body having a protrusion extending therefrom and longitudinally mounted into the second connector, and a connecting seat slidably mounted to the body, the connecting seat having a recess defined in a bottom of the connecting seat and communicating with the third passage, a path defined in the connecting seat, the path extending through the connecting seat and communicating with the recess for guiding the compressed into the work device.

5. The pneumatic pruning hook as claimed in claim 4, wherein the work device comprises a cylinder longitudinally mounted to the connecting seat and a piston reciprocally movably received in the cylinder, a fixed blade mounted on a top of the cylinder and a movable blade pivotally mounted to the fixed blade to form a scissors structure, a crank having a first end pivotally connected to the piston and a second end pivotally connected to the movable blade for driving the movable blade moved toward the fixed blade.

6. The pneumatic pruning hook as claimed in claim 5, wherein the safety comprises:
   two rails extending from the work device and each having a groove laterally defined therein, the two grooves opposite to each other, each rail including a top having a first dimple defined near the work device and a second dimple defined near a free end of each of the rail; and
   a slider slidably mounted on the two rails and selectively engaged to the movable blade, the slider having two blind holes each aligning with a corresponding one of the two rails and receiving a spring, a steel ball received in a corresponding one of the two blind holes and partially extending out of the slider for being received in a corresponding one of the first and the second dimples to hold the slider in place due to a restitution force of each of the two springs, the slider including two opposite sides each having a buckle laterally extending therefrom and slidably received in a corresponding one of the two grooves in the two rails to prevent the slider from detaching from the rails.

7. The pneumatic pruning hook as claimed in claim 1 further comprising a locking device mounted on the second end of the outer tube to hold the inner tube in place when the inner tube extends to a suitable length relative to the outer tube.

8. The pneumatic pruning hook as claimed in claim 7, wherein:
   the outer tube has a first hole defined therein and extending therethrough near the second end of the outer tube;
   the inner tube has a series of second holes defined therein and each selectively communicating with the first hole in the outer tube; and
   the locking device includes a collar mounted around the outer tube and a lever pivotally mounted on the collar, a stub pivotally connected to a first end of the lever of the locking device and extending through the first hole and a corresponding one of the series of second holes to hold the inner tube in place relative to the outer tube, a torsion spring mounted between the collar and the lever of the locking device to provide a restitution force to the lever after being pushed.

* * * * *